United States Patent [19]

Balenger

[11] Patent Number: 4,512,432

[45] Date of Patent: Apr. 23, 1985

[54] WEIGHT TRANSDUCER FOR INEXPENSIVE ELECTRONIC SCALE

[76] Inventor: John W. Balenger, Rte. 4, Box 152, Leesburg, Va. 22075

[21] Appl. No.: 449,919

[22] Filed: Dec. 15, 1982

[51] Int. Cl.³ .......................... G01G 3/14; G01G 3/08; G01G 21/24

[52] U.S. Cl. .................................. 177/211; 177/229; 177/255

[58] Field of Search .......... 177/211, 229, 255, DIG. 9

[56] References Cited

U.S. PATENT DOCUMENTS 3,512,595  5/1970  Laimins ........................... 177/255 X
3,837,416  9/1974  Nozaki ............................ 177/211 X

*Primary Examiner*—George H. Miller, Jr.
*Attorney, Agent, or Firm*—Jim Zegeer

[57] ABSTRACT

There is disclosed an accurate and relatively inexpensive electronic scale. A parallelogram linkage is provided having one link stationary and secured to or formed integral with the scale housing. A cantilever sensing beam has bonded strain gauges on the tension and compression sides of the beam, the cantilever beam accomodating deflection within its elastic range related to the applied force. The stationary end of the cantilever beam is secured proximate the stationary end of the parallelogram linkage. The free end of the cantilever beam is connected to the link of the parallelogram linkage opposite the fixed or stationary link by flexible coupling member to constitute a compact weight transducing system. The strain gauges are connected in an electrical bridge circuit to provide an electrical analog signal that is an accurate measure of the weight of the postal article and an analog to digital converter is controlled by a microprocessor which also controls the keyboard input and display functions.

6 Claims, 7 Drawing Figures

WEIGHT TRANSDUCER FOR INEXPENSIVE ELECTRONIC SCALE

BACKGROUND OF THE INVENTION

There are many electronic scales on the market which weigh articles, such as letters, packages, and other postal articles, and perform a computation such as the exact United States Postal Service or United Parcel Service charges, including various ways of converting zip code numbers to zone numbers for entering into a computer for making the computation. However, they are all very expensive machines which are generally uneconomical or not affordable by the small office or home having relatively small or (under about 50) daily usage requirements. In general, it may be said that these electronic weighing systems are too complex and expensive for the average small user.

The object of the present invention is to provide a low cost and accurate electronic weighing system. A further object of the invention is to provide an electronic weight transducer which is relatively rugged. A further object of the invention is to provide such an electronic weighing system which is easily assembled from relatively few components.

In accordance with the invention, the transducing of the weight of an article to an electrical analog signal is performed by means of a novel parallelogram linkage and cantilever beam-strain gauge assembly. The parallelogram linkage has a fixed or stationary link which is adapted to be nested in and secured to an injection molded housing frame and securely fastened. The cantilever sensing beam, having bonded strain gauges on the tension and compression sides or surfaces thereof, has the free end of the beam connected to the movable parallel link of the parallel linkage (which is opposite to the fixed or stationary link) by a flexible coupling member so that even though there may be sidewise play in the linkage, the vertical component of force applied to the free end of the cantilever beam is an accurate measure of the vertical force thereon. The scale pan is secured to the movable parallel link so that any article resting on the pan transmits a force to the link which is thereby converted to an electrical signal by the strain gauges. The strain gauges are connected in an electrical bridge circuit to provide, at very low cost, an accurate electrical analog signal and an analog to digital converter preferably controlled by a microprocessor, produces digital signals for display and computation purposes. The analog to digital converter is controlled by the microprocessor which also controls a keyboard and display functions input.

BRIEF DESCRIPTION OF THE DRAWINGS

The above and other objects, advantages and features of the invention will become more apparent when considered with the following specification and accompanying drawings wherein.

The invention will be described in connection with its use in a postal scale, but it will be appreciated that the weight transducer of this invention has many other applications such as in diet scales, counting scales, etc.

Figure 1:
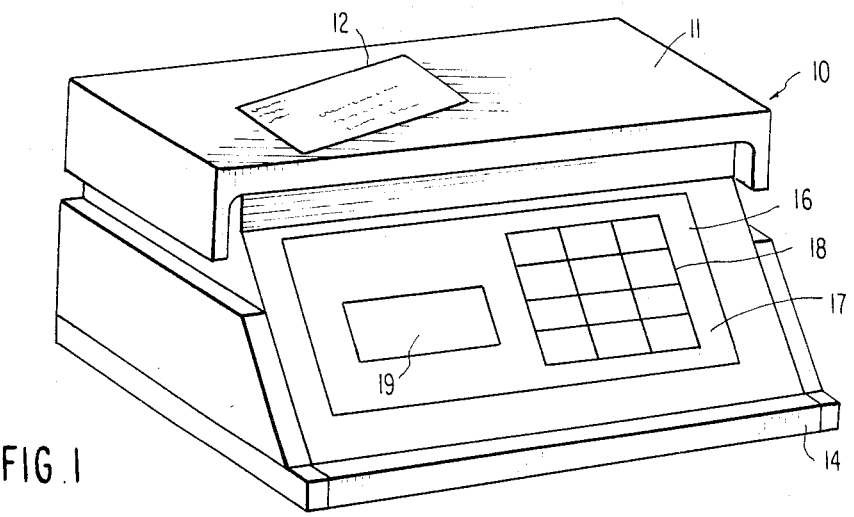
FIG. 1 is an isometric view of a scale incorporating the invention.

Referring now to FIG. 1, the postal scale 10 incorporating the invention has an injection molded plastic pan 11 upon which articles 12, such as a letter, may be received for determination of the proper postage due. As will appear more fully hereafter, pan 11 is coupled to a parallelogram linkage, which in turn is coupled to a cantilever sensing beam upon which are bonded stress gauges. The base housing 13 of postal scale 10 is likewise injection molded and has a lower closure panel 14 secured by screw fasteners or the like to the housing 13. An opening 16 in the front panel 17 has positioned therein a keyboard 18 and read-out display 19. In this embodiment, keyboard 19 is of the membrane type with contacts therebetween mounted in a matrix array which is coupled by a flexible cable (element 30 in FIG. 3) to the circuit board which is mounted therebelow. Pan 11 is mounted above base 13 for free and unobstructed movement whenever any object is placed on the upper surface of pan 11.

Figure 2:
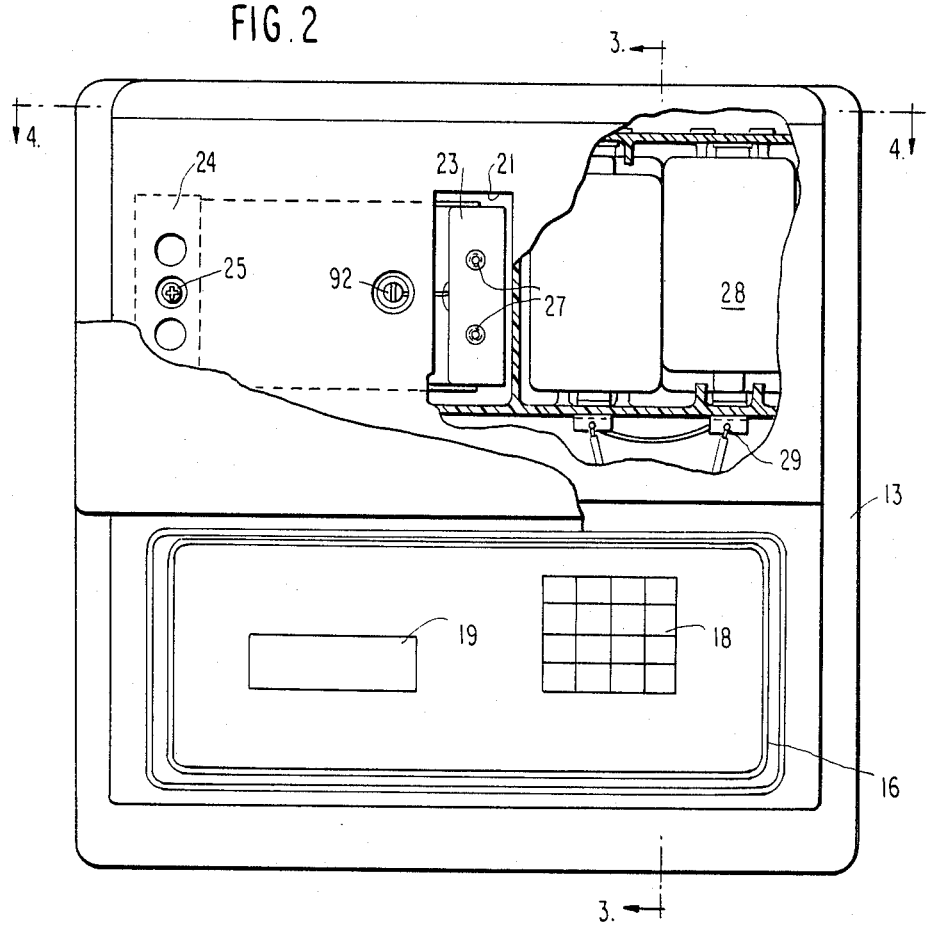
FIG. 2 is a top plan view with a portion of the scale pan, and underlying housing portion removed to reveal the construction.
Figure 4:
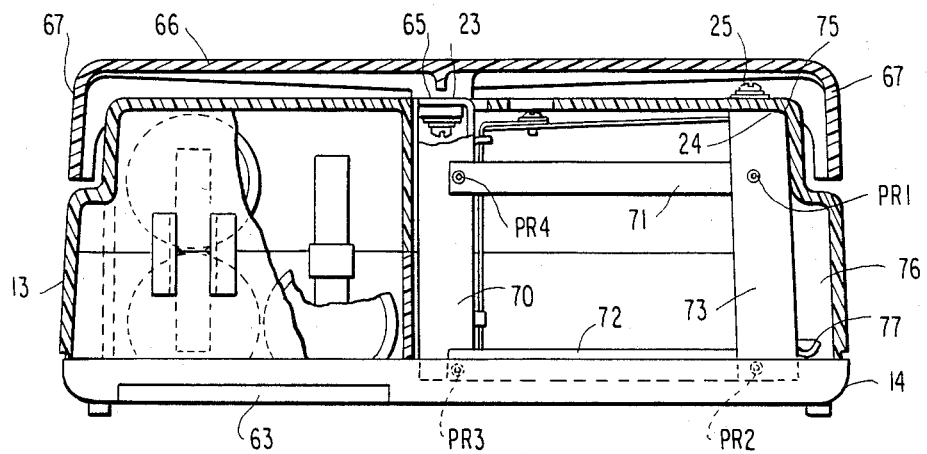
FIG. 4 is a sectional view taken on lines 4—4 of FIG. 2.

As shown in the top plan view of FIG. 2, with a portion of the pan and underlying housing removed, an opening 21 is formed in the upper surface 22 of lower housing component 13 to permit the pan 11 to be secured to the projecting upper flat surface 23 of the movable parallel link of the parallelogram linkage to be described more fully hereafter. The stationary end of the parallelogram link 23, shown in dotted section in FIG. 2, is secured by a screw 25 in a semipocket or socket which is shown in FIG. 4. A pair of threaded screw fasteners 27 pass through the end surface 23 of this linkage portion to be fastened to the underside of scale pan 11.

A cut-away portion of the upper surface 22 reveals a battery compartment and batteries 28 therein, the battery compartment being sufficient to receive four typical "D" cell batteries, it being appreciated, however, that the battery compartment can be adapted to receive a conventional six volt battery, if desired, or any number of other batteries. The batteries and connectors or contacts to the battery terminals 29 and the wiring connectors therebetween are adapted to connect these batteries in series so that the battery supply will be approximately six volts.

Figure 3:
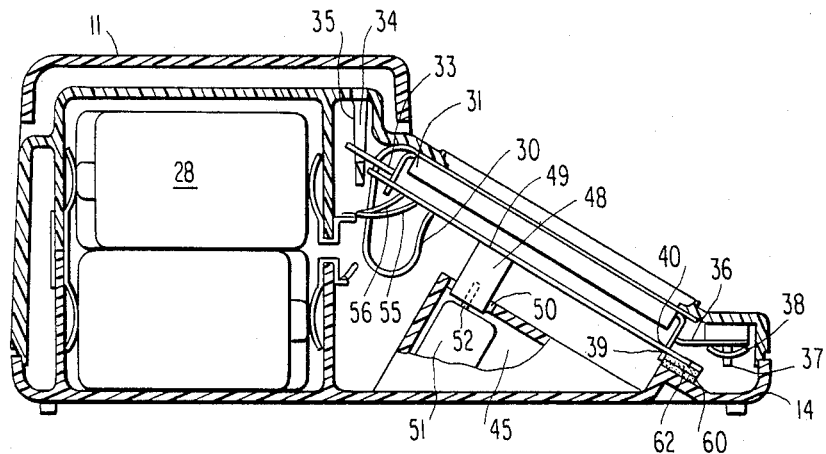
FIG. 3 is a sectional view taken on lines 3—3 of FIG. 2.

As shown in FIG. 3, the membrane keyboard 18 is provided with a flexible cable 30 which couples to the printed circuit board 31. A metal frame 32 has projecting lugs 33 which enter openings 34 in mounting lugs 35 of the injection molded housing and the U-shaped metal frame 32 is securely fastened in place by its extended fastener tabs 36 which are secured to lugs 37 by spring clips 38. Lugs 39 on U-shaped metal frame 32 pass through mounting openings 40 of printed circuit board 31 and maintain the circuit board in secure relationship to the frame 32. The metal frame 32 thus serves as a guard or shield element for the circuit board. At the same time, the U-shaped metal frame 32 provides a strong support for the membrane keyboard. A cut out or window (not shown) is provided in the frame for display 19. The display 19 is mounted on the printed circuit board 31 in a conventional fashion.

Postal rates, which are changable, are stored in a programmable read-only memory module which is adapted to be changed whenever the postal rate changes. Accordingly, a recess 45 is formed in the lower surface 46 of housing 13. A circuit board connector 48 is secured to the rear surface 49 of circuit board 31 with the circuit board connectors or sockets passing through an opening 50 communicating with the recess 45. A small module 51, carrying a projecting printed circuit board connector 52, carries a programmable read-only memory for reading by the microprocessor. Thus, plug-in module 51 is removable for changing the postal rate used in calculating the postage due on a given postal article.

Connections to the batteries 28 is made by a pair of wires 55, 56. A foam pad 60 is positioned between the edge of circuit board 31 and a plurality of parallel pads 62 so as to absorb and dampen any shock transmitted to or from circuit board 31 and thus assist in stabilizing the movement of pan 11. Access to the battery compartment is provided through an access door 63.

WEIGHT TRANSDUCER

Figure 5:
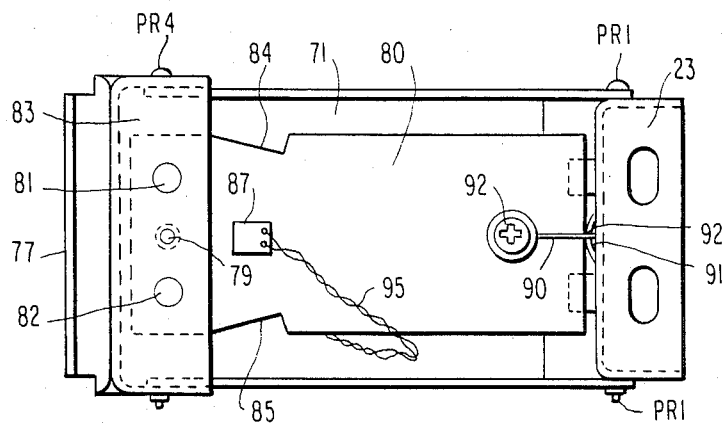
FIG. 5 is a top plan view of the weight transducer mechanism according to the invention.
Figure 6:
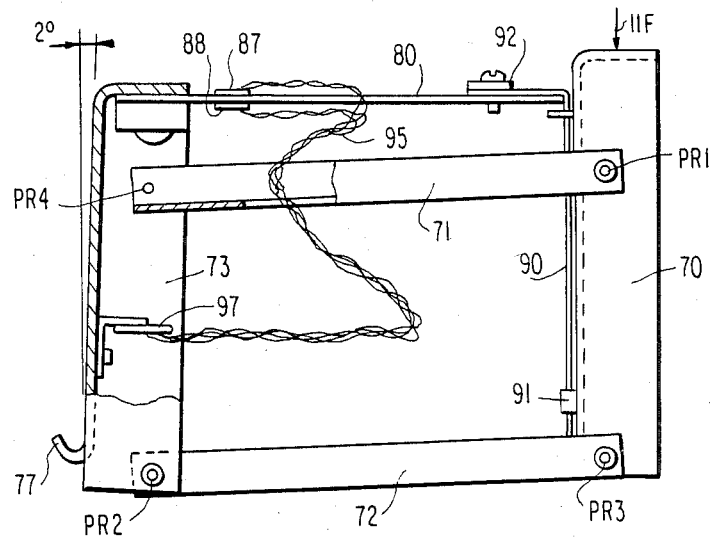
FIG. 6 is a side elevational view of the weight transducer mechanism shown in FIG. 5.

Any weight that is placed on pan 11 creates a downward force and the underside of pan 11 is configured so as to transmit all forces applied to the upper surface of the pan to surface 65 on the understructure of pan 11, this understructure being constituted by a plurality of ribs 66 which radiate outwardly to the lateral edges 67 of pan 11. A movable link 70 of a parallelogram linkage (shown in greater detail in FIGS. 5 and 6), is secured by a pair of set screws passing through openings 27 (FIG. 2) of the surface 23 of movable link 70. Thus, any motion of pan 11, as when a postal article is placed on the surface thereof, is transmitted to movable link 70. A pair of rectangular channel members 71, 72 are coupled to a stationary link 73. As shown in FIG. 6, stationary link 73 has the left side thereof (as seen in FIG. 6) shaped so as to fit within a semipocket or socket 75 which is formed on the internal surfaces of the upper edge 22 of housing 13. A molded projection 76 is likewise formed integral with the housing to mate with hook 77 of stationary link 73 so that when threaded fastener 25 is engaged with a threaded bore 79, this link 73 is made completely stationary and rigid with the housing of the scale. It will be appreciated that stationary link 73 could be molded integral with the housing and the cantilever sensing beam and other links of the linkage fastened and pivoted in relation thereto.

Cantilever sensing beam 80 is secured by a pair of screws 81, 82 to the overturned flange 83 of the fixed or stationary link 73 of the parallelogram linkage. A threaded bore 79 is formed in the end of cantilever sensing beam 80 so that the screw fastener 25 provides an additional securement for the fixed end of cantilever sensing beam. As shown in the top plan view of FIG. 5, the cantilever sensing beam 80 has its sides tapered or notched as at 84, 85 and, in the center of the beam at a point approximately where the maximum tension and compression takes place, a pair of strain gauges 87, 88 are bonded to the surfaces thereof so that changes in the resistance due to strain can be converted into voltage changes by means of a wheatstone type bridge as is well known in the art. In this preferred embodiment, the upper strain gauge 87 will be placed in tension and the lower strain gauge 88 will be placed in compression.

According to the invention, the opposite or free end 89 of cantilever sensing beam 80 is coupled by a wire 90 to the link 70 to which the scale pan 11 has been secured. The scale pin 11 is indicated as a force vector 11F in FIG. 6. The lower end of wire 90 is secured in the center of link 70 by a loop and bead fastener 91 and the upper end of wire 90 passes in and is received in a small centering notch or groove 92 in the center of end 89 of cantilever sensing beam 80 and is secured in place by a screw clamp 92. Thus, when any force 11F is applied to link 70, the parallelogram linkage constituted by link 71, 72 and stationary link 73 constrain the force to be transmitted via wire 92 to the center of the cantilever sensing beam 80. This force causes the free end of sensing beam 80 to be deflected downwardly thereby bending the cantilever beam 80 which in turn is coupled to movable link 70 by wire 90. As noted, the bending movement of the free end of cantilever beam 80 generates tensile force or strain in strain gauge 87 and compressive force in strain gauge 88. As will be described more fully hereafter in connection with the schemmatic block diagram of FIG. 7, these strain gauges are connected in a conventional strain gauge bridge circuit so as to develop the analog electrical signal corresponding to the weight of the postal article on pan 11.

Links 71 and 72 are pivotally secured at their respective ends by very small diameter pivot pins or rods PR1 ... PR4. The openings in the ends of the links through which these small diameter rods pass are slightly larger than the diameter of the rods so that there is only tangential surfaces contacts to eliminate friction and hysteresis in these joints. The flexible connecting via wire 90 eliminates the effect of any eccentric loading on the sensing beam 80. The cantilever sensing beam 80 is made of aluminum, but it can be made of any metal that follows Hook's Law and as long as its elastic limit thereof is not exceeded should not require any maintenance. Links 70, 71, 72 and 73 are made of sheet steel and formed into channel sections for rigidity.

Figure 7:
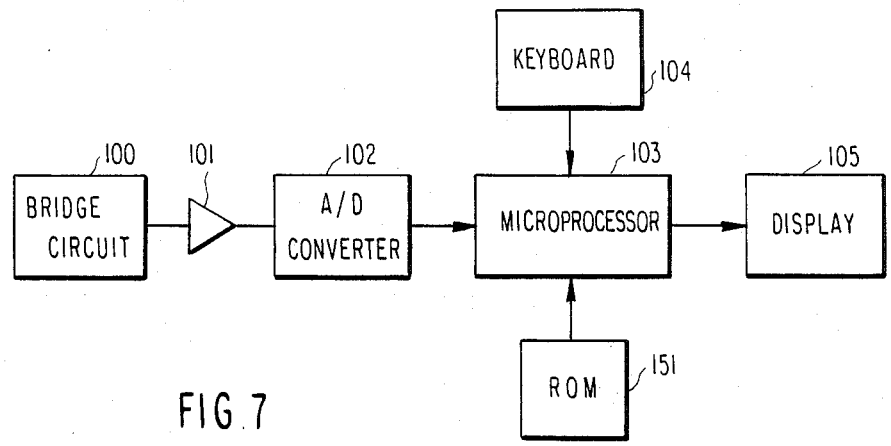
FIG. 7 is a simplified schemmatic block diagram of the electrical circuitry utilized in the invention.

A simplified block diagram of the circuit for converting the strain gauge electrical outputs signals to digital signals and performing various computations is shown in FIG. 7. Conventionally, strain gauges 87 and 88 are connected in a bridge circuit 100 and the electrical output signals are amplified by one or more amplifiers 101, which, in turn, supplies the analog weight signals to analog-to-digital (A/D) converter 102 which converts the analog weight signals of the article 12 on scale pan 11 to a digital signal. A microprocessor 103, which may be programmed to control A/D converter 102, receives these digital weight signals, along with inputs from keyboard 104 and, in the case of a postal scale, postal rate information from read only memory 151 (contained in the plug-in module 51 shown in FIG. 3) and supplies an output signal for display on display means 105. It will be appreciated that microprocessor 103 is conventional. When the scale is used as a diet scale, for example, or as a counting scale, read only memory 151 may be eliminated.

While the invention has been described in connection with a preferred embodiment, it will be appreciated that numerous modifications will be apparent to those skilled in the art and it is intended that such apparent and obvious modifications be included within the scope of the claims appended hereto.

What is claimed is:

1. In an electronic scale having a cantilever beam with strain gauges bonded to the surface of said beam, stationary support means for one end of said beam, a parallelogram linkage having four rigid link members, one of which is included in said stationary support means and low friction pivot means pivotally connecting the link members proximate their ends in said parallelogram linkage, respectively, and with the free end of said cantilever beam extending proximate the pass of movement of the opposite link parallel to said stationary support means to which said cantilever beam is supported and a flexible linkage coupling the end of said beam to said opposite parallel link and electrical circuit means connected to said strain gauges for producing an electrical signal proportional to the weight of said load, the improvement comprising, said cantilever beam being a flat metal plate having a notch formed in the center of the free end of said beam, said flexible wire link being seated in said notch and secured to one end of said cantilever beam and the end opposite to said opposite parallel link to eliminate the effect of eccentric loading on said cantilever beam.

2. The electronic scale defined in claim 1 wherein said low friction pivot means is constituted by small diameter rods, openings in said links through which said small diameter rods pass being slightly larger than the diameter of said rods so that there is only tangential surface contact in said pivot means to thereby eliminate friction and hysteresis in said pivot means.

3. The electronic scale defined in claim 1 wherein said support means is constituted by a member having an external hook shape, and including a housing of injection molded plastic, said housing having a pocket forming structure shaped to be complementary to the external shape of said stationary support means and snuggly fit into said pocket as to be firmly retained therein by a single fastener.

4. A weight transducer comprising in combination a stationary base structure, a flat cantilever sensing beam having one end secured to said stationary base structure, said flat cantilever sensing beam having electrical strain gauge means secured to opposing surfaces thereof to sense compression and tension strains in said cantilever sensing beam, a linkage system, including a portion of said stationary base structure, said linkage system having essentially friction free pivot means pivotally securing said linkage system to said stationary base structure, said linkage system having at least one member for receiving the weight to be transduced and constrained to move vertically along a fixed vertical path, a flexible wire means connecting the center of the cantilever sensing beam to said at least one member of said linkage system to eliminate the effect of any eccentric loading on said flat cantilever sensing beam.

5. The weight transducers defined in claim 4 wherein a wire centering and retaining notch is formed in the center of said sensing beam and said wire is seated in said notch.

6. The weight transducer defined in claim 5 wherein said essentially friction free pivot means is constituted by small diameter rods received in larger diameter holes so that there is only tangential surface contact to thereby substitute climate friction and hipterisis from said pivot means.

* * * * *